Patented Mar. 10, 1936

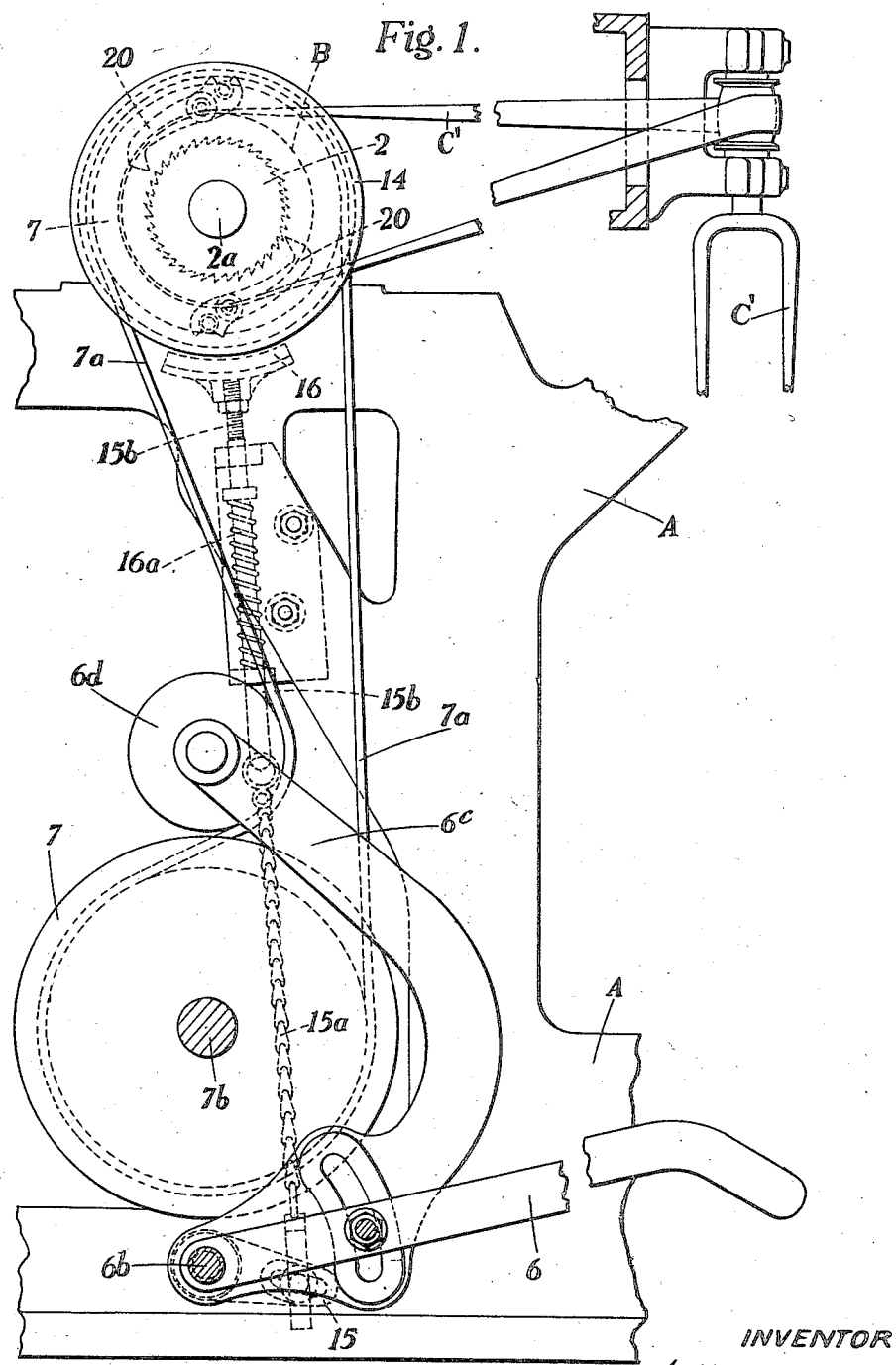

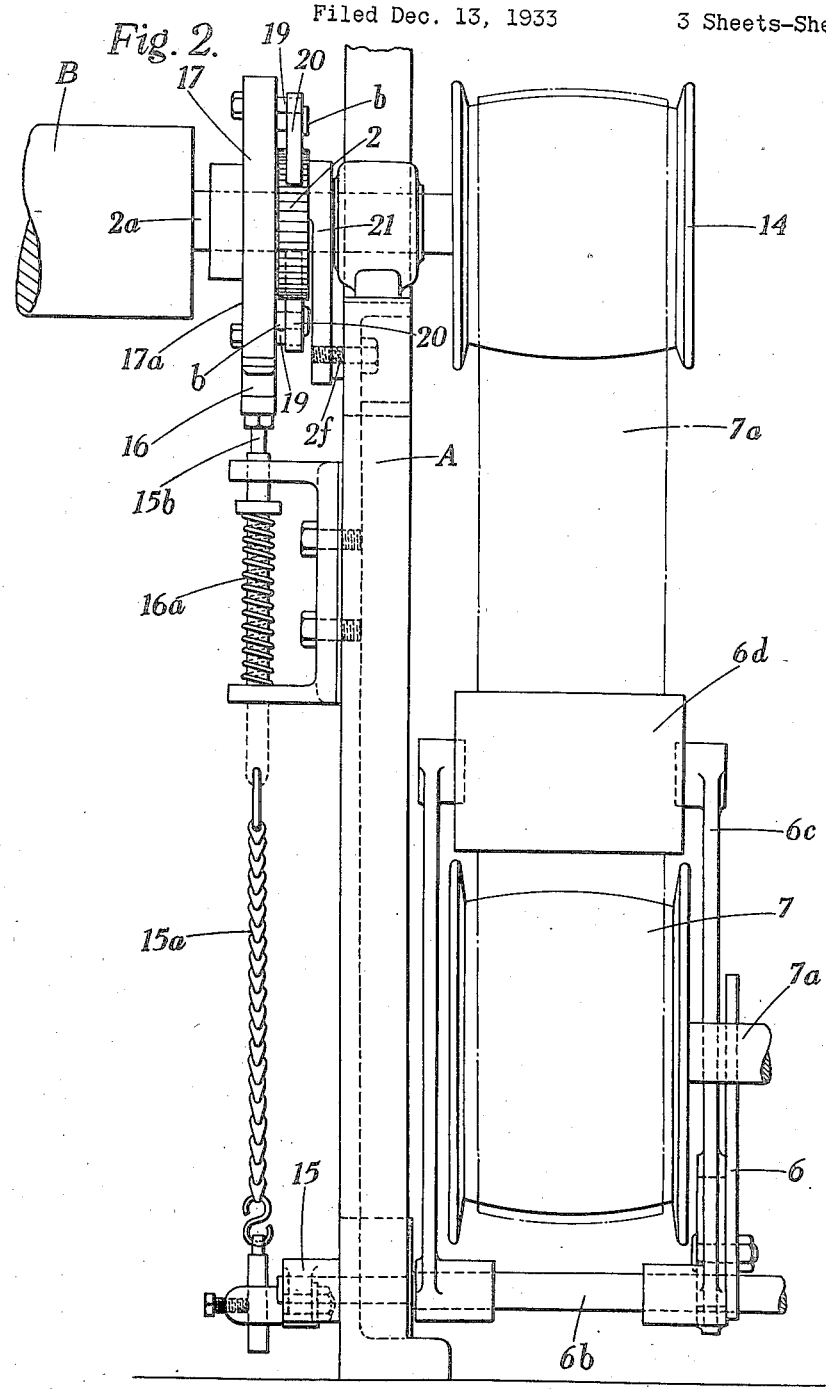

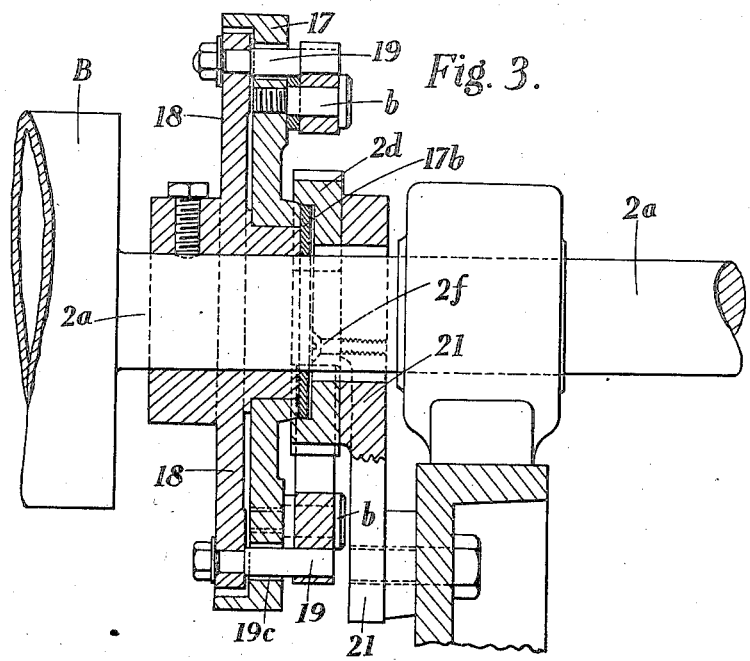
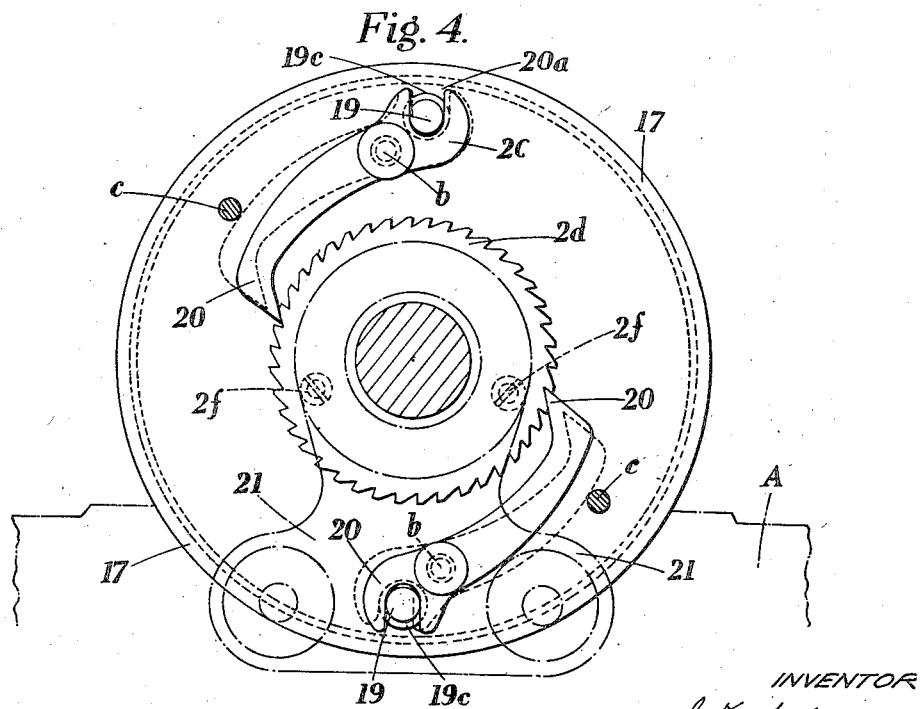

2,033,603

UNITED STATES PATENT OFFICE 2,033,603

POWER CONTROL AND BRAKE MECHANISM

James Keith Anderson, Wellington, Foundry, Leeds, England

Application December 13, 1933, Serial No. 702,231
In Great Britain June 12, 1933

5 Claims. (Cl. 192—11)

In spinning, doubling, twisting and like machines for the production of yarns or threads of fibrous substances, especially of the comparatively heavy type where jute, flax, or hemp is the substance being treated, it is often found that when the effective operations of the machine are arrested, a rebounding action is set up which causes the driving cylinders, which transmit motion to the flyers, to revolve for a space in the reverse or opposite direction with the result that the yarns or threads are untwisted as well as being brought into a relaxed or slack condition which greatly interferes with the subsequent doffing operations, particularly when these are carried out mechanically.

To obviate this disadvantage or undesirable action by the employment of means or devices hereinafter described, is the object of my invention. This object I secure by arranging my devices or mechanism to be brought into action to prevent reverse motion of the driving cylinder as stated, simultaneously with the disengaging of the driving mechanism in such a manner that on said disengaging mechanism being manually operated, pawl devices are permitted to engage with ratchet wheels simultaneously with the full stoppage of the advancing movement of the cylinder, so that all return action is thereby prevented.

One form of mechanism for controlling the engaging actions of the pawls, comprises the employment of brake devices which, when the driving gear is disengaged, will come into action with the result that the pawls are made to engage with a fixed ratchet wheel immediately the advancing motion of the cylinder is arrested and prior to any reverse motion being transmitted thereto.

In order that my said invention may be readily understood, I have hereunto appended sheets of drawings illustrative thereof, to which, by figures and letters, reference is made in the following description:—

Fig. 1 is an end elevation of mechanism or devices which I employ according to one method of carrying out my invention.

Fig. 2 is a front elevation of the devices shown by Fig. 1.

Fig. 3 is a sectional front elevation of certain of the parts shown by Figs. 1 and 2, the same being drawn to an enlarged scale.

Fig. 4 is a sectional elevation of certain of the parts shown by Fig. 3 as seen from right to left of said figure.

A indicates the end frame of the machine, and B the cylinder which transmits motion to the flyers C'.

To attain the object of my invention in accordance with one arrangement of devices, I make use of the parts or mechanical members shown by Figs. 1, 2, 3 and 4. In this arrangement I fix a manually operated lever 6 upon a short shaft 6b pivoted to the end frame A, while on the same shaft is mounted another arm 6c which is fixed to the arm 6 and has mounted upon it a tension pulley 6d. This tension pulley 6d engages the driving belt 7a which takes around the driving pulley 7 that is mounted upon the driving shaft 7b (which may be that of an electric motor) while the belt 7a is carried around a pulley 14 fixed upon the driven shaft 2a of the cylinder B. Thus when the lever 6 is in the position shown by Fig. 1 where it puts tension upon the belt 7a, the motion of the pulley 7 will be transmitted to the cylinder B as desired.

Mounted to oscillate upon the shaft 6b is another lever 15 which is connected by a chain 15a to the sliding rod 15b of a brake 16, which brake 16 is urged into contact with a flange 17a of a loose disc 17 that runs loosely upon the hub of a driven disc 18 which is fixed to the shaft 2a. The driven disc 18 has studs 19 fixed upon it and arranged to extend through slightly enlarged openings 19c (Fig. 4) formed in the loose disc 17, so that the outer ends of these studs may take into notches 20a of the pawls 20. These pawls 20 are shown as two in number (but more or fewer may be employed). The pawls 20 are pivoted upon studs b which are carried by and fixed to the loose disc 17, while a stop pin c for arresting the motion of said pawls 20 in each case, is made use of. The pawls 20 are for engagement with the ratchet wheel 2d which is fixed by screws 2f, or otherwise, to a bracket 21 that is fixed to the end frame A. Thus the ratchet wheel 2d is held against rotation for the purpose hereinafter explained.

On the attendant starting the machine into operation by placing the lever 6 in the low position shown by Fig. 1, the rotary motions of the shaft 2a, which are transmitted to the cylinder B, are also transmitted to the driven disc 18, and immediately this disc moves forward the disc 17 will be prevented from moving rapidly with it on account of having an additional brake face 17b formed upon it to take against the face of the ratchet wheel 2d as shown by Fig. 3. By this arrangement, the advancing movement by the disc 18 will cause the stud 19 also to advance through the larger sized openings 19c in the disc 17 through which they pass. By these means said studs 19 will engage with the notches or slots 20a in the short arms of the pawls 20 and will move same out of engagement with the fixed wheel 2d and retain them in contact with the stop pins c, and while they remain in these positions the motion of the machine continues as desired.

The brake face 17b is always in engagement with the face of the ratchet wheel 2d as only very slight retardation is required to prevent the moving of the ratchet wheel without first moving the pawl 20. It is only on the starting of the machine that such retardation is necessary.

When the motions of the machine have to be arrested the attendant reverses the motion of the lever 6 to raise it from the position shown by Fig. 1 to bring the tension pulley 6d away from the belt 7a and therefore the tension on said belt will be removed so that said belt will cease to transmit motion to the cylinder B. On this taking place the lever 15 will have moved upwardly or risen into position to allow the spring 16a to force the brake 15 against the flange 17a of the disc 17. As said disc 17 will still be rotating with the disc 18 by reason of the actions of the studs 19, the pawls 20 will be held out of engagement with the teeth of the wheel 2d, but since the studs 19 are allowed a slight movement in their engaging openings 19c, when the disc 18 has its forward action finally arrested any rebounding or return motion of same immediately actuates the pawls 20 and causes them to effectively engage with the teeth of the fixed wheel 2d and so all undesirable reverse rebounding actions are prevented. Such being the nature and object of my said invention, what I claim is:—

1. A spinning or like machine comprising mechanism for imparting motion to the flyers of the machine, said mechanism including a driving shaft, means for imparting forward rotation therefrom to said flyers, and means for preventing reversed rotation of said flyers, said means comprising a ratchet wheel, means for supporting said ratchet wheel and holding same against rotation, pawls for engaging the teeth of said ratchet wheel, and provided with short arms having slots, a rotary disc upon which said pawls are pivoted, studs taking loosely through openings in said disc to operate the disc and cooperate with the slotted arms of the said pawls pivoted thereon, another disc upon which the studs are secured, and a brake member engaging the side surfaces of the ratchet wheel and the hub of the pawl-carrying disc.

2. A spinning or like machine comprising mechanism for imparting motion to the flyers of the machine, said mechanism including a driving shaft, means for imparting forward rotation therefrom to said flyers, and means for preventing reversed rotation of said flyers, said means comprising a ratchet wheel, means for supporting said ratchet wheel and holding same against rotation, pawls for engaging the teeth of said ratchet wheel, a rotary disc upon which said pawls are pivoted, said disc having lateral openings extending therethrough, another disc adjoining the pawl-carrying disc and having studs extending through and movable in the openings in the pawl-carrying disc, a brake member engaging the periphery of the pawl-carrying disc and means for operating said brake.

3. A spinning or like machine comprising mechanism for imparting motion to the flyers of the machine, said mechanism including a driving shaft, means for imparting forward rotation therefrom to said flyers, and means for preventing reversed rotation of said flyers, said means comprising a fixed ratchet wheel, supports for said wheel, pawls for engaging the teeth of said wheel, a disc for supporting the engaging pawls pivoted thereon, studs taking through said disc to operate the pawls and the disc, another disc to which the studs are fixed, a driven shaft upon which the stud carrying disc is fixed, said shaft having a cylinder, means for imparting motion to the driven shaft and to said cylinder, and means for transmitting the motion of the cylinder to rotate the flyers of the machine.

4. A spinning or like machine comprising mechanism for imparting motion to the flyers of the machine, said mechanism including a driving shaft, means for imparting forward rotation therefrom to said flyers, and means for preventing reversed rotation of said flyers, said means comprising a ratchet wheel, means for supporting said ratchet wheel and holding same against rotation, pawls for engaging the teeth of said ratchet wheel, a rotary disc upon which said pawls are pivoted, said disc having lateral openings extending therethrough, another disc adjoining the pawl-carrying disc and having studs extending through and movable in the openings in the pawl-carrying disc, a brake member engaging the periphery of the pawl-carrying disc, a spring for forcing said brake member into contact with the periphery of the disc, and manually operated lever devices for removing the brake from contact with said disc.

5. A spinning or like machine comprising mechanism for imparting motion to the flyers of the machine, said mechanism including a driving shaft, means for imparting forward rotation therefrom to said flyers, and means for preventing reversed rotation of said flyers, said means comprising a ratchet wheel, means for supporting said ratchet wheel and holding same against rotation, pawls for engaging the teeth of said ratchet wheel, a rotary disc upon which said pawls are pivoted, said rotary disc having lateral openings extending therethrough, another disc adjoining the pawl-carrying disc and having studs extending through and movable in the openings in the pawl-carrying disc, a brake member engaging the periphery of the pawl-carrying disc, a spring for actuating the brake in one direction, a lever for operating the said brake in the other direction, a hand operated lever for engaging and disengaging the machine's driving belt, and a shaft coupling the hand lever to the brake operating lever to secure their simultaneous movement.

JAMES KEITH ANDERSON.